United States Patent [19]

Okada

[11] 3,806,632

[45] Apr. 23, 1974

[54] BALANCED TYPE PHASE COMPARATOR CIRCUIT

[75] Inventor: Takashi Okada, Yamato, Japan

[73] Assignee: Sony Corporation, Tokyo, Japan

[22] Filed: Sept. 19, 1972

[21] Appl. No.: 290,387

[30] Foreign Application Priority Data

Sept. 21, 1971 Japan ................................ 46-73564

[52] U.S. Cl. ............ 178/5.4 SD, 307/232, 328/134, 329/50

[51] Int. Cl. ........ H04n 9/50, H03k 5/20, H03d 3/18

[58] Field of Search .................. 178/5.4 SD; 329/50; 307/232; 328/133, 134

[56] References Cited

UNITED STATES PATENTS 3,519,841 7/1970 Leinfelder ............................ 329/50

*Primary Examiner*—Robert L. Griffin
*Assistant Examiner*—George G. Stellar
*Attorney, Agent, or Firm*—Hill, Sherman, Meroni, Gross & Simpson

[57] ABSTRACT

This invention involves a novel balance type phase comparator circuit which is relatively insensitive to temperature changes, and which circuit is a balanced type in which no voltage change appears at the output when the input signal is zero, even if a reference signal is applied thereto. The circuit requires no capacitors and is particularly suited for IC circuits. One particular application of the invention is for color demodulation in a color television receiver where the input signal is the chrominance signal and the reference signal is the 3.58 MHz subcarrier.

18 Claims, 13 Drawing Figures

BALANCED TYPE PHASE COMPARATOR CIRCUIT

BACKGROUND OF THE INVENTION

1. Field of the Invention

The field of the present invention is a phase comparator circuit such, for example, as is used in the color demodulator section of a color television receiver. It also relates to AFC circuits and other circuits where the phase of two signals are to be compared and an output signal derived which is a function thereof.

2. Description of the Prior Art

Many phase comparator circuits are described in the prior art, and the disclosures of U.S. Pat. No. 3,628,046 and U.S. Pat. No. 3,651,418 are examples of such prior art disclosures. In these two prior art patents, an input signal is amplified which causes the output signal to vary with temperature changes of the transistors used therein. When three phase comparator circuits are used for color demodulators in a color television receiver to produce three color difference signals, R-Y, B-Y and G-Y from the chrominance signal, a good white balance in the reproduced picture is not obtained because of temperature variations in the circuits.

SUMMARY OF THE INVENTION

The present invention comprises a balanced type push-pull phase comparator circuit in which the voltage gain is one, which requires no capacitors, and which is substantially insensitive to temperature variations in the semiconductor devices used in the circuit. In a preferred form of the invention, input signals are applied to the bases of two transistors which appear at an output terminal through either one of two series connected semiconductor switches consisting of a transistor and a diode or two diodes, which do not amplify the input signal.

It is thus an object of the present invention to provide a novel phase comparator which readily lends itself to the use of integrated circuits.

It is a further object of the present invention to provide a novel phase comparator circuit which is particularly useful in color television receivers.

DESCRIPTION OF THE PREFERRED EMBODIMENTS

Figure 1:
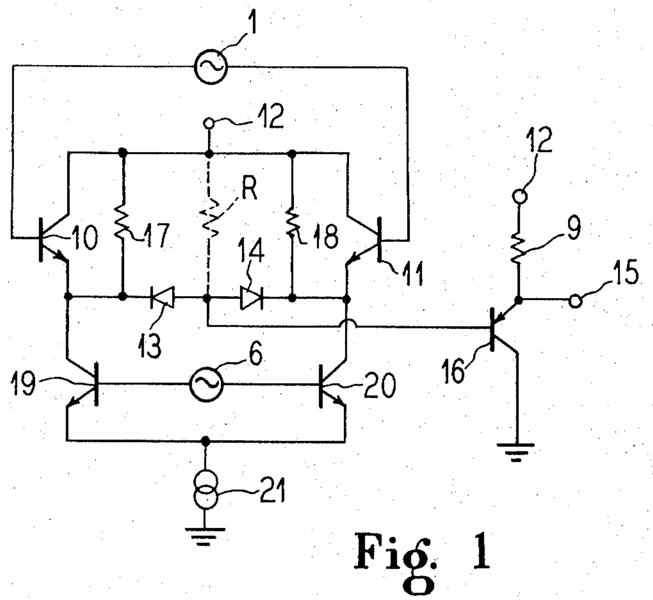
FIG. 1 diagrammatically illustrates a phase comparator circuit embodying a preferred form of the present invention.

One preferred embodiment of the present invention is illustrated in FIG. 1 where the input signal is shown as 1 and the reference signal is shown as 6. By way of example, and not by way of limitation, the input signal may be the chrominance signal 1 of a color television receiver and the reference signal 6 may be the 3.58 MHz subcarrier. Two npn input transistors 10 and 11 are provided between the bases of which the input signal 1 is connected. The collectors of the two transistors 10 and 11 are connected to a positive voltage bias 12. Two diodes 13 and 14 are connected back to back between the emitters of transistors 10 and 11, the anode sides of the two diodes forming the back-to-back connection.

The emitters of transistors 10 and 11 are additionally connected to the collectors of a pair of switching transistors 19 and 20. The bases of transistors 19 and 20 have the reference signal source connected therebetween. The emitters of transistors 19 and 20 are connected together and to a constant current source 21. Resistors 17 and 18 for supplying bias voltage are connected respectively between the collector and emitter of transistors 10 and 11.

A pnp output transistor 16 has its base connected to the midpoint between diodes 13 and 14. Its emitter is connected to a voltage bias source 12 through a resistor 9 which bias source may be the same as that described for transistors 10 and 11. The emitter of transistor 16 is also connected to an output terminal 15. The collector of transistor 16 is connected to ground as is the constant current source 21.

The resistor R shown in dotted lines is normally not in the circuit. It is, however, inserted under certain circumstances as will hereinafter be described.

The circuit of FIG. 1 functions as follows. The subcarrier signal 6 as shown in FIG. 2C is applied between bases of transistors 19 and 20. When a high voltage $V_h$ is applied to the base of the transistor 19 as well as a phase reversed signal or a low voltage $V_1$ to the base of the transistor 20, the transistors 19 and 20 are ON and OFF, respectively, and hence the diode 13 and the transistor 10 are held ON, but the diode 14 and the transistor 11 are held OFF. Note that the emitter of transistor 11 has substantially the same bias potential as the collector.

A signal which appears at the emitter of transistor 10 through the base to emitter is obtained at the connecting point of the diodes 13 and 14 or at the terminal 15. When $V_1$ is applied to the transistor 19 and $V_h$ is applied to the transistor 20, the diode 14 and the transistor 11 are held ON so that a signal which appears at the emitter of transistor 11 through the base to emitter is obtained at the terminal 15.

Figure 2A:
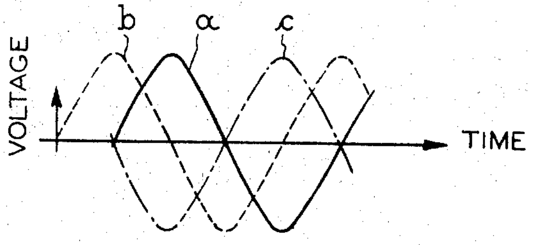
FIG. 2A–F are voltage wave forms as a function of time illustrating different operating conditions of the circuit of FIG. 1.
Figure 2B:
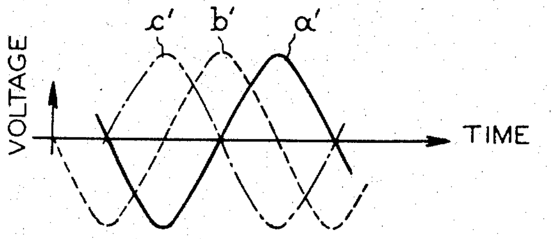
Figure 2C:
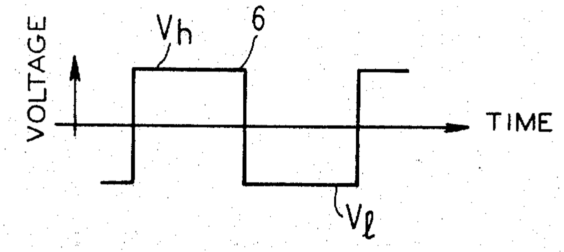
Figure 2D:
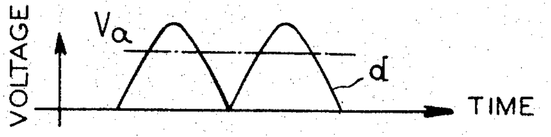

When signals *a* and *a'* as shown in FIGS. 2A and 2B are applied to the bases of the transistors 10 and 11, respectively, a phase compared signal *d* as shown in FIG. 2D is obtained at the terminal 15, because the signal applied to the base of transistor 10 or 11 appears directly at the emitter of transistor 10 or 11. Therefore, an average dc signal $V_a$ is obtained if the signal d from the terminal 15 is smoothed through a conventional low-pass filter. The average dc signal $V_a$ corresponds to a phase difference between the chrominance signal 1 and the subcarrier signal 6.

Figure 2E:
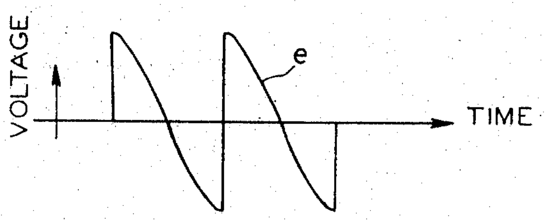

When signals *b* and *b'*, which are delayed by 90° in phase compared with the signals *a* and *a'*, are applied to the bases of transistors 10 and 11, a phase compared signal *e* as shown in FIG. 2E at the terminal 15. An average signal of the signal *e* becomes zero if the signal *e* is smoothed.

Figure 2F:
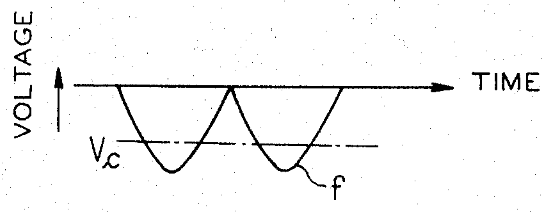

When signals *c* and *c'* which are delayed by 180° compared with the signals *a* and *a'* are applied to the bases of transistors 10 and 11, a phase compared signal f is obtained at the terminal 15 as shown in FIG. 2F. An average signal from the signal $f$ becomes $V_r$ after smoothing.

In this circuit, base voltages of the transistors 10 and 11 are held at the predetermined voltage by a bias circuit (not shown) when a chrominance signal is zero, so that a voltage at the terminal does not vary even if the subcarrier signal is applied to the bases of transistors 19 and 20. In other words, this circuit is a balanced type so that the subcarrier signal does not appear in the output signal at the terminal 15.

In the above example, a reference signal is applied between the bases of transistors 19 and 20. However, the reference signal may be applied only to one of the bases if the constant bias is supplied to the other base, since the transistors 19 and 20 operate as differential switches.

Further, in the above example, a pnp transistor 16 is used to apply a forward bias to the diode 13 or 14. If an npn transistor is used for a pnp transistor or a phase compared signal is directly obtained from the connecting point of the diodes 13 and 14, a resistor R should be connected between the terminal 12 and the connecting point as shown in a dotted line in FIG. 1 to apply a forward current to either one of the diodes.

It will be noted from the above description that transistors 19 and 20 form differential switch means so that one transistor is held ON when the other transistor is held OFF. Thus transistors 19 and 20 are held ON and OFF alternately when the reference signal 6 as shown in FIG. 2C is applied between the bases thereof. During the time that the transistor 19 or the transistor 20 is held ON, the collector potential becomes substantially equal to that of the emitter, and hence the cathode potential of the diode 13 or the cathode potential of the diode 14 becomes lower than that of the anode to be forwardly biased. If no reference signal is applied, the diodes 13 and 14 are reversely biased, and no output signal appears at 15.

Figure 3:
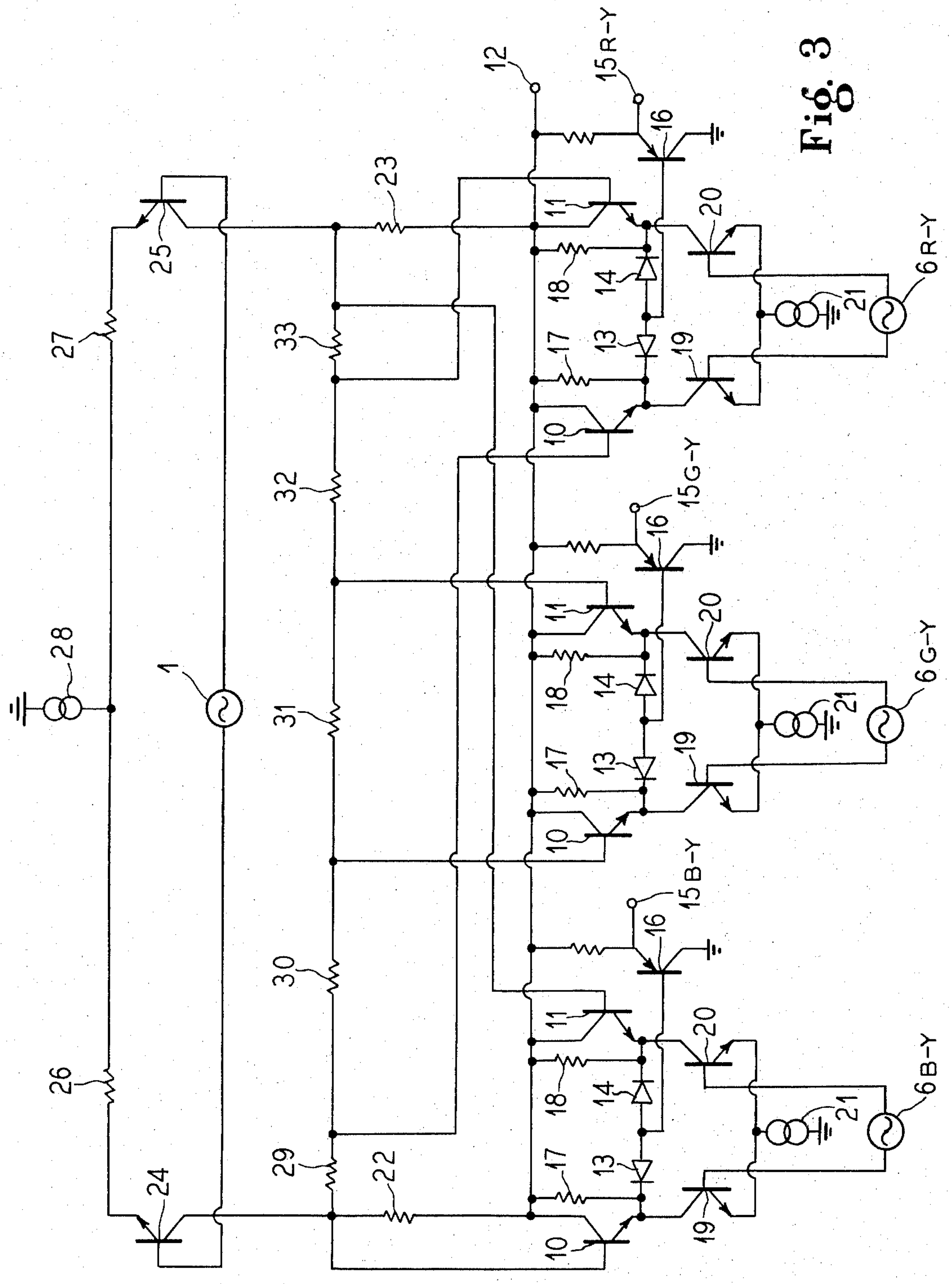
FIG. 3 illustrates how three of the circuits of FIG. 1 may be used as a color demodulator circuit in a color television receiver.

FIG. 3 shows a color demodulator for demodulating three color difference signals (R-Y), (G-Y) and (B-Y) from the chrominance signal. The positive bias voltage terminal 12 is connected to the collectors of transistors 24 and 25 through resistors 22 and 23, respectively. Emitters of the transistors 24 and 25 are connected to ground through resistors 26 and 27, respectively, and a constant current source 28. The chrominance signal 1 is applied between the bases of the transistors 24 and 25. Resistors 29, 30, 31, 32 and 33 are connected in series between collectors of the transistors 24 and 25.

A first reference signal $\mathbf{6}_{B\text{-}Y}$ for demodulating the (B-Y) signal, a second reference signal $\mathbf{6}_{G\text{-}Y}$ for demodulating the (G-Y) signal and a third reference signal $\mathbf{6}_{R\text{-}Y}$ for demodulating the (R-Y) signal are applied to three phase comparator circuits to obtain demodulated signals at terminals $\mathbf{15}_{B\text{-}Y}$, $\mathbf{15}_{G\text{-}Y}$ and $\mathbf{15}_{R\text{-}Y}$, respectively. The obtained signals are applied to a color CRT through low-pass filters for obtaining a color picture. If values of resistors 29 to 33 are selected suitably to apply chominance signals having levels of 2.03 : 0.7 : 1.14 to the three phase comparator circuits respectively, three color difference signals which will produce a white balanced color picture are obtained at the terminals $\mathbf{15}_{B\text{-}Y}$, $\mathbf{15}_{G\text{-}Y}$ and $\mathbf{15}_{R\text{-}Y}$.

In this circuit, the voltage gain of each of the three phase comparator circuits is one, and the levels of the chrominance signals applied to each of the phase comparator circuits vary simultaneously and equally in level even if the level of the chrominance signal source 1 varies. Therefore, the ratio between three output signals is always constant through a wide temperature range.

Figure 4:
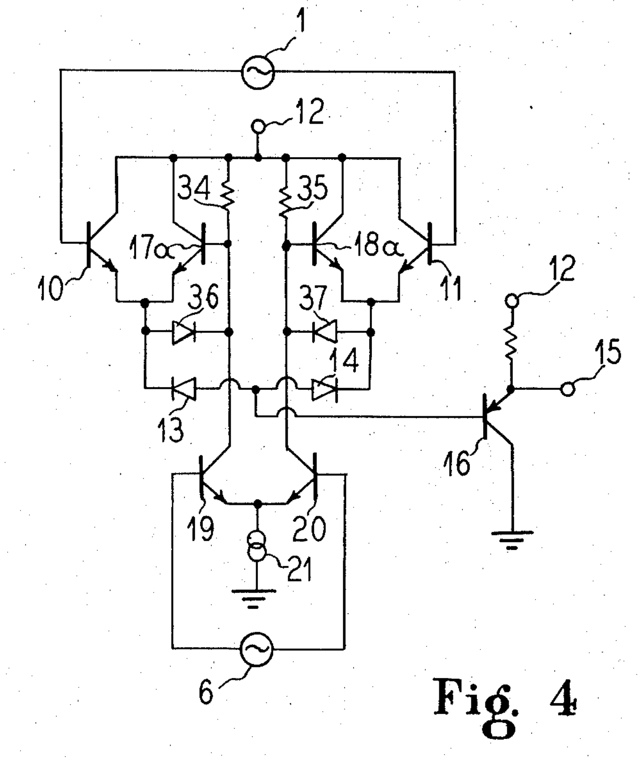
FIGS. 4 to 8 are circuit diagrams of modified forms of phase comparator circuits.

FIG. 4 shows another embodiment of the present invention. In this example, a transistor 17a (or 18*a*), a resistor 34 (or 35) and a diode 36 (or 37) is used for the resistor 17 (or 18) in FIG. 1.

When the transistor 19 (or 20) is held ON, the transistor 10 (or 11) and the diodes 13 and 36 (or 14 and 37) are held ON, but the transistor 17*a* (or 18*a*) is held OFF because the base voltage of the transistor 17*a* (or 18*a*) is held lower than the emitter voltage of the transistor 17*a* (or 18*a*) by a forward voltage of the diode 36 (or 37). While the transistor 20 (or 19) is held OFF, a base voltage of the transistor 18*a* (or 17*a*) is held to the dc source voltage so that the transistor 18*a* (or 17*a*) is held ON to bias the diode 14 (or 13) and the transistor 11 (or 10) in reverse direction. Therefore, a signal which is applied to the base of transistor 10 (or 11) is obtained at the terminal 15.

Note that currents through the transistors 10 and 11 flow transitorily when the reference signal switches from positive to negative and vice versa. Further, it is possible to select a value for resistors 34 and 35 higher than that of resistors 17 and 18 in the example shown in FIG. 1, respectively, without deteriorating switching characteristics of the circuit. Therefore, the power consumption of this circuit can be reduced compared with the above examples.

Figure 5:
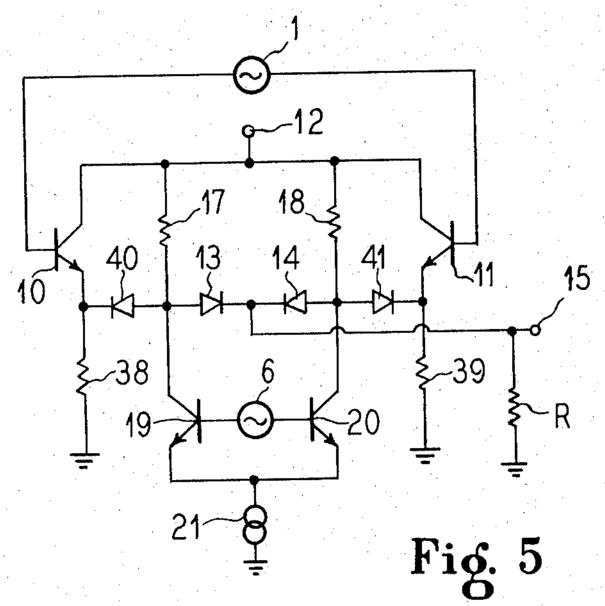

FIG. 5 shows another example of this invention. The emitter of the transistor 10 (or 11) is grounded through a resistor 38 (or 39) and is connected to the transistor 19 (or 20) through a diode 40 (or 41). A resistor R is connected between the connecting point of diodes 13 and 14 and ground.

When the transistor 19 (or 20) is held ON and the transistor 20 (or 19) is held OFF, the diodes 13 (or 14) and 40 (or 41) are held OFF and the diodes 14 (or 13) and 41 (or 40) are held ON, whereby the signal applied to a base of the transistor 11 (or 10) appears at the terminal 15 through the base to the emitter of the transistor 11 (or 10) and the diodes 41 (or 40) and 14 (or 13).

Figure 6:
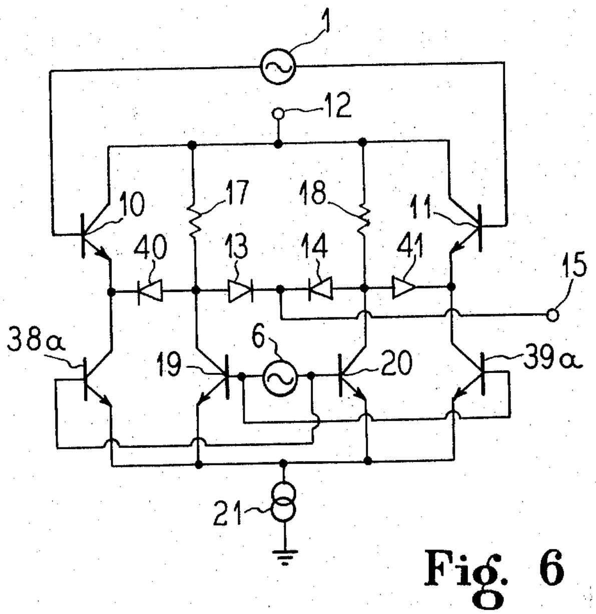

FIG. 6 shows an improved circuit of the example shown in FIG. 5. The resistors 38 and 39 used in FIG. 5 are replaced with transistors 38*a* and 39*a*, because the power consumption of the resistors 38 and 39 is undesirable. The opposite phase signals are applied to bases of the transistors 19 (or 20) and 38*a* (or 39*a*), respectively, whereby unnecessary currents through transistors 38*a* and 39*a* are prevented respectively.

Figure 7:
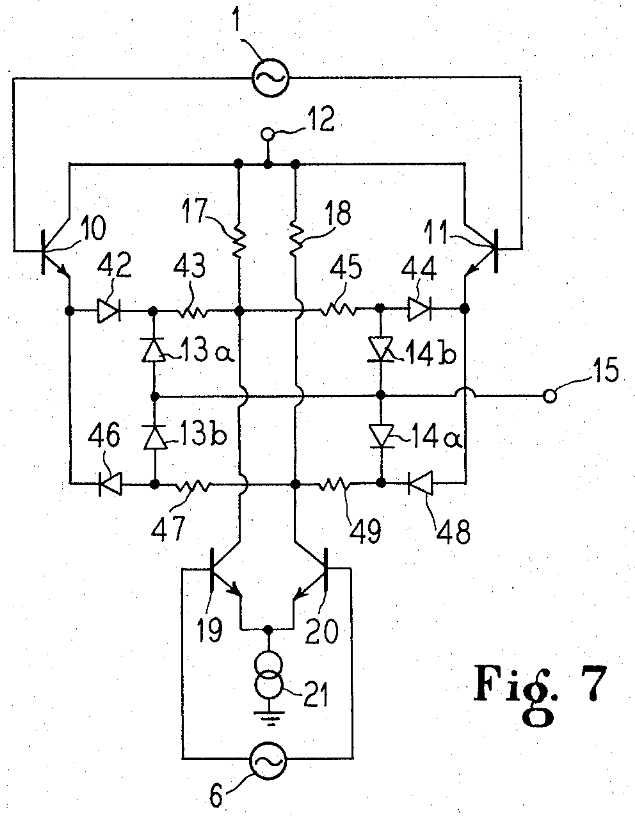

FIG. 7 shows another example of this invention. Switching diodes 13 and 14 used in the above examples are replaced with a bridge of diodes 13*a*, 13*b*, 14*a* and 14*b*. Numerals 42, 44, 46 and 48 are diodes, and 43, 45, 47 and 49 are resistors. When the transistor 19 (or 20) is held ON and the transistor 20 (or 19) is held OFF, the diodes 13*a* (or 14*a*) and 42 (or 48) are held ON by currents through the resistors 18 (or 17) and 47 (or 49) and the diodes 13*b* (or 14*b*) and 46 (or 44), so that the signal applied to the base of the transistor 10 (or 11) appears at the output terminal 15.

In the foregoing examples, the transistors 10 and 11 are used for applying a signal to be compared. However, the transistors serve to connect the signal selectively to the switching diodes, for example, diodes 13 and 14, so that the transistors 10 and 11 may be replaced with diodes as shown in FIG. 8 if the impedance of the signal source 1 is low.

Figure 8:
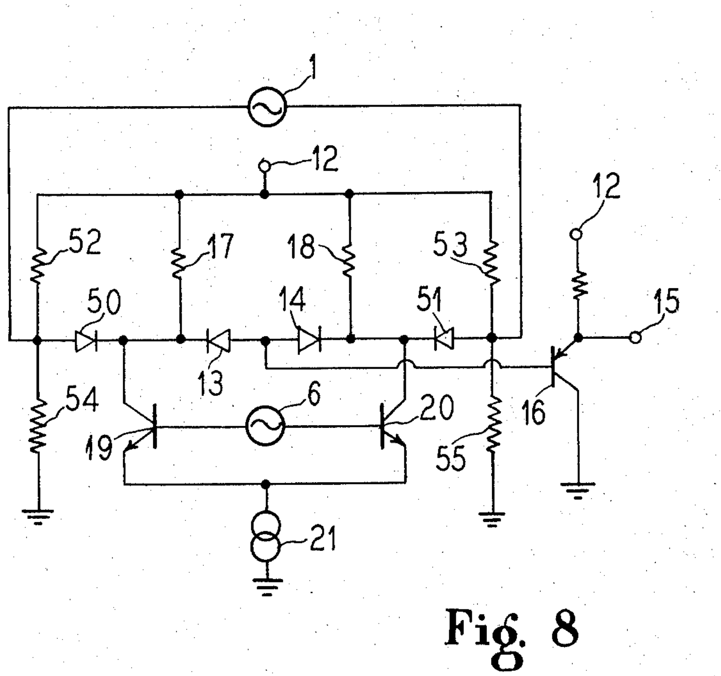

In FIG. 8, diodes 50 and 51 are provided for the transistors 10 and 11. Resistors 52 (or 53) and 54 (or 55) are used to apply a bias to an anode of the diode 50 (or 51) so as to hold the diode ON when the transistor 19 (or 20) is held ON.

Therefore, a phase compared signal is also obtained at the terminal 15 in this circuit as well as the foregoing examples.

Although the invention has been described in connection with the preferred embodiments, it is not to be so limited as changes and modifications may be made which are within the full intended scope of the invention as defined by the appended claims.

I claim as my invention:

1. A phase comparator circuit comprising:
- a pair of signal input terminals;
- first, second, third and fourth PN junction means connected in series between said pair of signal input terminals in the manner that said first and second, second and third, and third and fourth PN junction means are connected in opposite directions to each other, respectively;
- a dc source having a pair of terminals;
- means for connecting one terminal of said dc source to said first and fourth PN junction means, respectively;
- first and second switching means each having at least first and second terminals;
- means for connecting said first terminals of said first and second switching means respectively to the junction points between said first and second, and third and fourth PN junction means;
- means for connecting the respective second terminals of said first and second switching means to the other terminal of said dc source;
- a reference signal source connected to at least one of said first and second switching means to alternately switch them on and off and thereby to render said second and third PN junction means alternately conductive; and
- an output terminal connected to the junction point between said second and third PN junction means for deriving a signal indicative of the phase relationship between said input signal and said reference signal.

2. A phase comparator circuit as set forth in claim 1, wherein said means for connecting the second terminals of said first and second switching means to the other terminal of said dc source comprises a constant current source.

3. A phase comparator circuit as set forth in claim 2, wherein said first and second switching means respectively comprise first and second transistors of one conductivity type each having base, emitter and collector electrodes; said first and second terminals are collector and emitter electrodes, respectively; and said reference signal is applied to at least one of the base electrodes of said first and second transistors.

4. A phase comparator circuit comprising:
- a pair of input transistors of one conductivity type each having base, emitter and collector electrodes;
- a dc source having a pair of voltage terminals;
- means for connecting the collector electrodes of said input transistors to one of said voltage terminals;
- an input signal source connected between the base electrodes of said input transistors;
- a pair of PN junction means;
- means for connecting said pair of PN junction means in series between the emitter electrodes of said input transistors in the manner that the respective PN junctions between the base and emitter electrodes of said input transistors are connected in opposite directions relative to the adjacent PN junction means;
- a pair of switching transistors of said one conductivity type each having base, emitter and collector electrodes;
- means for connecting the collector electrodes of said switching transistors to the emitter electrodes of said input transistors, respectively;
- constant current means connected between the respective emitter electrodes of said switching transistors and the other of said voltage terminals;
- a reference signal source;
- means for connecting said reference signal source to at least one of the base electrodes of said pair of switching transistors to alternately switch them on and off and thereby to render said pair of PN junction means alternately conductive; and
- an output terminal connected to the junction point between said pair of PN junction means for deriving a signal indicative of the phase relationship between said input signal and said reference signal.

5. A phase comparator circuit comprising:
- first and second transistors each having base, emitter and collector electrodes;
- a dc source having a pair of voltage terminals;
- means for connecting the collector electrodes of said first and second transistors to one of said voltage terminals;
- an input signal source connected between the base electrodes of said first and second transistors;
- first and second PN junction means connected in series between the emitter electrodes of said first and second transistors, said first and second PN junction means being connected in opposite directions to each other;
- first and second switching means each having at least first and second terminals;
- means for connecting the first terminals of said first and second switching means directly to the emitter electrodes of said first and second transistors, respectively;
- a constant current source connected between the respective second terminals of said first and second switching means and the other of said voltage terminals;
- a reference signal source connected to at least one of said first and second switching means to alternately switch them on and off and thereby to render said first and second PN junction means alternately conductive; and
- an output terminal connected to the junction point means for deriving a signal indicative of the phase relationship between said input signal and said reference signal.

6. A phase comparator circuit as set forth in claim 5, wherein said first and second switching means comprise third and fourth transistors, respectively, each having base, emitter and collector electrodes; said first and second terminals are collector and emitter electrodes, respectively; and said reference signal source is applied to at least one of the base electrodes of said third and fourth transistors.

7. A phase comparator circuit as set forth in claim 6, including a bias voltage source connected to the collector electrodes of said third and fourth transistors, respectively.

8. A color television receiver demodulating circuit comprising:

- a first pair of transistors of one conductivity type each having base, emitter and collector electrodes;
- a chrominance signal source;
- means for connecting said chrominance signal source between the base electrodes of said transistors;
- a dc source having a pair of voltage terminals;
- a constant current source;
- means for connecting said constant current source between one of said voltage terminals and the respective emitter electrodes of said transistors;
- means for connecting the collector electrodes of said transistors to the other of said voltage terminals;
- a plurality of voltage dividing resistors serially connected between the collectors of said transistors; and
- a plurality of phase comparator circuits to selectively demodulate color difference signals present in the chrominance signal, each phase comparator circuit including
  - a pair of input transistors of said one conductivity type each having base, emitter and collector electrodes,
  - means for connecting the collector electrodes of said input transistors to said other voltage terminal,
  - means for connecting the base electrodes of said input transistors across preselected ones of said voltage dividing resistors,
  - a pair of PN junction means,
  - means for connecting said pair of PN junction means in series between the emitter electrodes of said input transistors in the manner that respective PN junctions between the base and emitter electrodes of said input transistors are connected in opposite directions relative to the adjacent PN junction means,
  - a pair of switching transistors of said one conductivity type each having base, emitter and collector electrodes,
  - means for connecting the collector electrodes of said switching transistors to the emitter electrodes of said input transistors respectively,
  - constant current means connected between the respective emitter electrodes of said switching transistors and said one voltage terminal,
  - a reference signal source,
  - means for connecting said reference signal source to at least one of the base electrodes of said pair of switching transistors to alternately switch them on and off and thereby to render said pair of PN junction means alternately conductive, and
  - an output terminal connected to the junction point between said pair of PN junction means for deriving a selectively demodulated color difference signal which indicates the phase relationship between said chrominance signal and said reference signal.

9. A circuit according to claim 8, in which there are three phase comparator circuits and in which said color difference signals are R-Y, B-Y and G-Y.

10. A circuit according to claim 8, in which the reference signal has a frequency of substantially 3.58 MHz.

11. A circuit according to claim 9, in which there are five of said voltage dividing resistors, the B-Y phase comparator circuit being connected across all five of said voltage dividing resistors, the G-Y phase comparator circuit being connected across the middle of one of said resistors, and the R-Y phase comparator circuit being connected across the middle three of said voltage dividing resistors.

12. A circuit according to claim 11, in which the voltage dividing resistors are selected so that the chrominance signals applied to the phase comparator circuits have a relative level of 2.03, 0.7 and 1.14 respectively.

13. A phase comparator circuit comprising:

- first and second pairs of transistors of one conductivity type each having base, emitter and collector electrodes;
- a dc source having a pair of voltage terminals;
- means for connecting the collector electrodes of said first and second pairs of transistors to one of said voltage terminals;
- means for connecting the emitter electrodes of said first pair of transistors to the emitter electrodes of said second pair of transistors, respectively;
- an input signal source connected between the base electrodes of said first pair of transistors;
- a first pair of PN junction means;
- means for connecting said first pair of PN junction means in series between the emitter electrodes of said first pair of transistors such that respective PN junctions between the base and emitter electrodes of said first pair of transistors are in opposite directions relative to the adjacent PN junction means;
- a second pair of PN junction means;
- means for connecting said second pair of PN junction means between the base and emitter electrodes of said second pair of transistors respectively such that the PN junctions between the base and emitter electrodes of said second pair of transistors are in opposite directions relative to said PN junction means connected thereacross, respectively;
- a pair of biasing circuit elements connected respectively between said one voltage terminal and the base electrodes of said second pair of transistors;
- A third pair of transistors of said one conductivity type base, emitter and collector electrodes;
- means for connecting the collector electrodes of said third pair of transistors to the base electrodes of said second pair of transistors, respectively;
- a constant current source connected between the respective emitter electrodes of said third pair of transistors and the other of said voltage terminals;
- a reference signal source;
- means for connecting said reference signal source to at least one of the base electrodes of said third pair of transistors to alternately switch them on and off and thereby to render said first pair of PN junction means alternately conductive; and an output terminal connected to the junction point between said first pair of PN junction means for deriving a signal indicative of the phase relationship between said input signal and said reference signal.

14. A phase comparator circuit comprising:
a pair of signal input terminals;
a first pair of transistors of one conductivity type each having base, emitter and collector electrodes;
means for connecting said pair of input terminals to the base electrodes of said first pair of transistors, respectively;
a dc source having a pair of voltage terminals;
means for connecting the collector electrodes of said first pair of transistors to one of said voltage terminals;
a first pair of resistors connected between the emitter electrodes of said first pair of transistors and the other of said voltage terminals, respectively;
first, second, third and fourth PN junction means connected in series between the emitter electrodes of said first pair of transistors such that the PN junctions between the base and emitter electrodes of said pair of transistors are respectively in opposite directions relative to the first and fourth PN junction means and the second and third PN junction means are respectively in opposite directions relative to the first and fourth PN junction means;
a second pair of resistors for connecting said one voltage terminal to a junction point between said first and second PN junction means and to a junction point between said third and fourth PN junction means, respectively;
a second pair of transistors of said one conductivity type each having base, emitter and collector electrodes;
means for connecting the collector electrodes of said second pair of transistors respectively to the junction point between said first and second PN junction means and to the junction point between said third and fourth PN junction means;
a constant current source connected between the respective emitter electrodes of said second pair of transistors and said other voltage terminal;
a reference signal source connected to at least one of the base electrodes of said second pair of transistors to alternately switch them on and off and thereby to render said first and second PN junction means and said third and fourth PN junction means alternately conductive; and
an output terminal connected to a junction point between said second and third PN junction means for deriving signal indicative of the phase relationship of said input signal and said reference signal.

15. A phase comparator circuit comprising:
a pair of signal input terminals;
a first pair of transistors of one conductivity type each having base, emitter and collector electrodes;
means for connecting said pair of input terminals to the base electrodes of said first pair of transistors, respectively;
a dc source having a pair of voltage terminals;
means for connecting the collector electrodes of said first pair of transistors to one of said voltage terminals;
first, second, third and fourth PN junction means connected in series between the emitter electrodes of said first pair of transistors such that the PN junctions between the base and emitter electrodes of said pair of transistors are respectively in opposite directions relative to the first and fourth PN junction means and the second and third PN junction means are respectively in opposite directions relative to the first and fourth PN junction means;
a pair of resistors for connecting said one voltage terminal to a junction point between said first and second PN junction means and to a junction point between said third and fourth PN junction means, respectively;
a second pair of transistors of said one conductivity type each having base, emitter and collector electrodes;
means for connecting the collector electrodes of said second pair of transistors to the emitter electrodes of said first pair of transistors, respectively;
a third pair of transistors of said one conductivity type each having base, emitter and collector electrodes;
means for connecting the collector electrodes of said third pair of transistors respectively to the junction point between said first and second PN junction means and to the junction point between said third and fourth PN junction means;
a constant current source connected between the other of said voltage terminals and the respective emitter electrodes of said second and third pair of transistors;
a reference signal source connected to at least one of the base electrodes of said second pair of transistors and one of the base electrodes of said third pair of transistors to alternately switch said second and third pair of transistors on and off respectively and thereby to render said first and second PN junction means and said third and fourth PN junction means alternately conductive; and
an output terminal connected to a junction point between said second and third PN junction means for deriving a signal indicative of the phase relationship of said input signal and said reference signal.

16. A phase comparator circuit comprising:
first, second, third and fourth circuit means each including a pair of series connected diodes, said series connected diodes in each of said circuit means having the same direction of conductive polarity;
means for connecting said first and second circuit means in parallel between first and second circuit points;
means for connecting said third and fourth circuit means in parallel between third and fourth circuit points;
first and second switching means each having at least first and second terminals;
a dc source having a pair of voltage terminals;
means for connecting said first circuit point to the first terminal of said second switching means;
means for connecting said third circuit point to the first terminal of said first switching means;

means including a first resistor for connecting said second circuit point and the first terminal of said first switching means commonly to one of said voltage terminals;

means including a second resistor for connecting said fourth circuit point and the first terminal of said second switching means commonly to said one voltage terminal;

means for connecting the respective second terminals of said first and second switching means to the other of said voltage terminals;

first signal input terminal connected to a junction point between the series connected diodes in said first circuit means;

second signal input terminal connected to a junction point between the series connected diodes in said third circuit means;

a signal source;

means for connecting said signal source between said first and second signal input terminals;

a reference signal source connected to at least one of said first and second switching means to alternately switch them on and off and thereby to render said first and second circuit means and said third and fourth circuit means alternately conductive; and an output circuit means commonly connected to respective junction points between the series connected diodes in said second and fourth circuit means for deriving a signal indicative of the phase relationship between said input signal and said reference signal.

17. A phase comparator circuit as set forth in claim 16, wherein said means for connecting the second terminals of said first and second switching means to the other terminal of said dc source comprises a constant current source.

18. A phase comparator circuit as set forth in claim 17, wherein said first and second switching means comprise first and second transistors of one conductivity type each having base, emitter and collector electrodes; said first and second terminals are collector and emitter electrodes, respectively; and said alternating reference signal is applied to at least one of the base electrodes of said first and second transistors.

* * * * *